3,737,535
METHOD OF FATTENING BEEF CATTLE
John R. Brethour, Experiment Station,
Hays, Kans. 67601
No Drawing. Filed Feb. 11, 1971, Ser. No. 114,694
Int. Cl. A61k 27/00
U.S. Cl. 424—243                                                     11 Claims

ABSTRACT OF THE DISCLOSURE

A method of fattening cattle utilizes a halogenated corticosteroid to increase marbling and improve the eating quality of the meat without increasing general carcass fatness. An acute dosage of 9α-fluoro-16α-methylprednisolone is administered to an animal after the animal has been placed on full feed and sufficiently in advance of slaughter to assure adequate time for intramuscular adipose tissue development.

---

This invention relates to the production of meat source animals, and, more particularly to a method of increasing adipose tissue development in bovine animals.

In recent years, consumer trends have dictated that beef producers provide the most lean cuts of meat possible. This has created the need for new techniques in the fattening of cattle since conventional methods whereby cattle are pastured for an extended peirod of time and then confined to a feed lot for consumption of a high grain diet and "finishing," results not only in an increase in intramuscular fat (marbling) which is desirable and improves the eating quality of the meat, but also in a substantial increase in other removable (trimmable) fat which is objectionable to the consumer and results in a wasty carcass. Under present standards by which meat is graded, a carcass which is high in separable fat is less desirable than a carcass where this "waste fat" is minimized. In addition, intramuscular fat (marbling) must be high for a high grading.

Ideally, the fattening of beef cattle should proceed so as to promote the growth of intramuscular adipose tissue, which is associated with flavor, juiciness, and to some extent tenderness of the meat without a general increase in carcass fatness. This requires alterations in the natural development of the animal since marbling fat is normally the last of the lipid deposits to be filled. Previous attempts to find feed supplements and physiologically active drugs to promote the development of intramuscular adipose tissue have either been without significant response, have increased both intramuscular and separable fat, or, in the case of drugs, have suffered from critical side effects.

It is, therefore, the primary object of the present invention to provide a method of increasing intramuscular adipose tissue development in bovine animals without significant increases in other fat.

An aim of the invention is also to provide a method of increasing intramuscular adipose tissue development in bovine animals without inducing adverse side effects.

Another object of the invention is to provide a method of increasing marbling in beef cattle through the use of a commercially available drug.

As a corollary to the above objects, one of the important aims of this invention is to provide a method of increasing marbling in bovine animals through the use of a physiologically active drug which can be administered in a single dosage for economical reasons and to reduce the possibility of side effects.

Other objects of the invention will be made clear or become apparent from the following description and claims.

Previous utilization of corticosteroids over prolonged periods of time has been limited by the fact that such drugs are known to result in catabolism of tissue protein with the carbon part of the amino acids thus released being utilized for the formation of glucose (i.e., gluconeogenesis) and the ultimate result being decreased muscle growth and increased overall adiposity.

In the present invention, it has been found that administering an acute dosage of 9-α-fluoro-16-α-methyl-prednisolone (dexamethasone) during the finishing phase of an animal's development results in a significant increase in the degree of marbling without an overall increase in adiposity and without the attendant side effects previously associated with corticosteroid drugs. Dexamethasone is available in commercial quantities from the Schering Drug Co. of Bloomfield, N.J.

By "acute dosage" it is meant that an effective quantity of the dexamethasone is administered to the animal at a site from which the dexamethasone will be completely absorbed into the system within a few hours, with not more than about 24 hours being an upper limit. The actual manner of physically administering the dexamethasone to achieve the acute dosage includes intravenous, intramuscular, subcutaneous and intraperitoneal injections as well as oral feedings. The aforedescribed techniques, all of which are well known to those skilled in the art, are to be contrasted with such methods of drug administration as ear implants where the drug is absorbed into the animal's system relatively slowly, over a period of several days or weeks.

The quantity of dexamethasone which comprises the above-referred to "acute dosage" should be sufficiently large to be effective while avoiding toxic levels. It is to be realized, of course, that while the exact dosage can be varied in line with the experience of one skilled in drug administration, in general it has been found that from 0.025–0.080 mg./kg. of live animal weight is effective in obtaining the desired response. Thus, 10–20 mg. is an effective dosage for injection of most feeder-weight beef cattle in the range of 300 to 450 kilograms. With oral feedings the dose may be five times or greater the dosage range set forth above. The invention has been found to be particularly useful in increasing marbling in feeder steers.

It is important that the dexamethasone be administered during the "finishing phase" of an animal's development. By "finishing phase" is meant that phase of the fattening process after the animal has been taken off pasture and is on full feed in a feed lot. During the finishing phase an animal is normally fed a high grain diet together with adequate roughage to promote maximum weight gain. It will be appreciated that the administration of dexamethasone should take place sufficiently in advance of slaughter to assure an adequate response from the animal and allow growth of the intramuscular fat cells to an extent that the flavor of the meat will be significantly affected. Although no specific limitations beyond those set forth above are intended, in general, administration of the dexamethasone during the period from about 90 to about 30 days prior to slaughter results in an adequate response.

The following data indicates the marked increase in carcass grading which is attributable to the present invention:

TABLE 1

Effect of 10 mg. dexamethasone injected intramuscularly, on marbling score

|  | Control |  |  |  |
|---|---|---|---|---|
| Time from start of feeding trial, days | | 70 | 84 | 127 |
| Days prior to slaughter | | 90 | 76 | 33 |
| Number of head | 25 | 13 | 13 | 15 |
| Initial weight, lb | 816 | 791 | 790 | 812 |
| Total gain, lb | 468 | 470 | 455 | 456 |
| Dressing percentage | 62.0 | 62.3 | 62.1 | 61.8 |
| Grade: | | | | |
| Prime | 0 | 1 | 3 | 0 |
| Choice+ | 2 | 3 | 1 | 4 |
| Choice | 11 | 6 | 4 | 6 |
| Choice− | 12 | 3 | 3 | 5 |
| Good | 0 | 0 | 2 | 0 |
| Marbling score | 5.27 | 6.06 | 5.99 | 5.96 |
| Percent: | | | | |
| Choice+ and prime | 8 | 31 | 31 | 27 |
| Average choice | 44 | 46 | 31 | 40 |
| Low choice and good | 48 | 23 | 38 | 33 |

The data in Tables 2 and 3, below, illustrates the effectiveness of the invention in different quantitative levels and at different sites of administration:

TABLE 2

Effect of dexamethasone on carcass grade using different quantitative dosages and different sites of administration

| Treatment 40 days prior to slaughter | Control, none | 10 mg. subcutaneously | 10 mg. intramuscularly | 20 mg. subcutaneously | 20 mg. intramuscularly |
|---|---|---|---|---|---|
| Number of head | 74 | 21 | 20 | 21 | 21 |
| Percent choice | 68 | 81 | 85 | 90 | 100 |

TABLE 3

Effects of dexamethasone on marbling score. Comparison of two quantitative levels and two loci of administration. Treatment 38 days prior to slaughter

| Treatment rate | Control group | 10 mg. | 10 mg. | 20 mg. | 20 mg. |
|---|---|---|---|---|---|
| Site | | [1] SC | [2] IM | SC | IM |
| Number of head | 25 | 21 | 21 | 21 | 21 |
| Initial weight, lb | 860 | 849 | 857 | 861 | 858 |
| Total gain, lb | 318 | 331 | 331 | 337 | 338 |
| Dressing percentage | 63.7 | 64.2 | 64.0 | 64.1 | 63.4 |
| Averaging marbling score | 4.74 | 5.12 | 5.28 | 5.18 | 5.38 |
| Percent: | | | | | |
| Choice+ and prime | | 10 | 10 | 10 | 10 |
| Choice | 16 | 10 | 19 | 5 | 14 |
| Choice− | 36 | 57 | 57 | 76 | 76 |
| Good | 48 | 23 | 14 | 9 | |

[1] Subcutaneous injection.
[2] Intramuscular injection.

The data in Table 4 below is indicative of the results obtained using acute doses of dexamethasone. As the data indicates, there is no significant decrease in rib eye area (muscle tissue) as a result of the dexamethasone treatment and no significant increase in backfat thickness (a recognized measure of separable fat).

TABLE 4

Effect of dexamethasone on carcass quality treatment: 20 mg. dexamethasone intramusculary 52 days before slaughter

|  | Treatment | |
|---|---|---|
|  | Control | Dexamethasone |
| Number of head | 9 | 10 |
| Total weight gain, lb | 134 | 120 |
| Carcass weight, lb | 586 | 577 |
| Rib eye area, sq. in | 11.4 | 11.3 |
| Backfat, in | .37 | .41 |

While I do not wish to be limited as to the particular physiological mechanism through which the unexpected results of the present invention are achieved, it is to be noted that the general increase in adiposity which has heretofore been associated with the prolonged administration of corticosteroid has previously been attributed to insulism resulting from increased gluconeogenesis, i.e., the products from the catabolism of tissue protein by the corticosteroid are utilized in the formation of excess glucose, and pancreatic β-cell hypertrophy. Had the increase in intramuscular adipose tissue development associated with the method of the present invention been a result of insulism, duplication of the results by the administration of an effective dosage of insulin could be expected. As illustrated by the data in Table 5 below, however, no response was obtained when a test group of cattle were given repeated injections of insulin.

TABLE 5

Effect of insulin on marbling score

|  | Control | Treatment |
|---|---|---|
| Number of head | 7 | 7 |
| Initial weight, lb | 841 | 851 |
| Total gain, lb | 320 | 302 |
| Dressing percent | 63.8 | 62.8 |
| Average marbling score | 5.09 | 4.94 |

[1] 400 units insulin injected subcutaneously at 36, 35 and 34 days prior to slaughter. Total feeding period 128 days.

On the basis of the foregoing data, it is thought that the single acute does of dexamethasone which is utilized in the present invention does not result in insulism. Prior researchers have concluded that fat cells can arise from reticuloendothelia precursors and the response achieved in the present invention is attributed to the selective initiation of cytogenesis of intramuscular fat from progenitor cells.

Having thus described the invention, what is claimed as new and desired to be secured by Letters Patent is:

1. A method for stimulating intramuscular adipose tissue development in bovine animals which comprises administering an acute dosage of 9-α-fluoro-16-α-methylprednisolone to an animal during the finishing phase of the animal's development and sufficiently in advance of slaughter to permit the growth of said tissue.

2. A method as set forth in claim 1, wherein said administering step includes administering said acute dosage to a steer having a weight range of from 300–450 kilograms.

3. A method as set forth in claim 1, wherein said administering step includes administering said acute dosage during the period from 90 to 30 days prior to slaughter of the animal.

4. A method as set forth in claim 1, wherein said administering step includes administering an acute dosage of said 9-α-fluoro-16-α-methylprednisolone in a quantity of from 0.025–0.080 mg./kg. of live animal weight, 5. A method as set forth in claim 4, wherein said administering step includes injecting said acute dosage intramuscularly into said animal.

6. A method as set forth in claim 4, wherein said administering step includes injecting said acute dosage intravenously into said animal.

7. A method as set forth in claim 4, wherein said administering step includes injecting said acute dosage subcataneously into said animal.

8. A method as set forth in claim 4, wherein said administering step includes injecting said acute dosage intraperitoneally into said animal.

9. A method as set forth in claim 4, wherein said administering step includes orally administering said acute dosage to said animal.

10. A method as set forth in claim 1, wherein said administering step includes administering an acute dosage of said 9-α-fluoro-16-α-methylprednisolone in a quantity of from 10 to 20 mg.

11. A method of stimulating intramuscular adipose tissue development in bovine animals which comprises injecting an acute effective dosage of 9-α-fluoro-16-α-methylprednisolone to an animal intramuscularly during the finishing phase of the animal's development and between about 90 and 30 days prior to slaughter of the animal.

References Cited

UNITED STATES PATENTS 3,036,917   5/1962   Harrop ---------------- 99—2

SAM ROSEN, Primary Examiner